(12) United States Patent
Hugl et al.

(10) Patent No.: US 11,240,811 B2
(45) Date of Patent: Feb. 1, 2022

(54) TRANSMISSION MODE WITH USER EQUIPMENT INDEPENDENT PHYSICAL DOWNLINK SHARED CHANNEL SCRAMBLING FOR INTER-CELL AND INTRA-CELL PDSCH-TO-PDSCH INTERFERENCE CANCELLATION

(71) Applicant: NOKIA TECHNOLOGIES OY, Espoo (FI)

(72) Inventors: Klaus Hugl, Vienna (AT); Panayiotis Papadimitriou, Espoo (FI); Cássio Ribeiro, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 986 days.

(21) Appl. No.: 14/787,102

(22) PCT Filed: May 7, 2013

(86) PCT No.: PCT/US2013/039873
§ 371 (c)(1),
(2) Date: Oct. 26, 2015

(87) PCT Pub. No.: WO2014/182285
PCT Pub. Date: Nov. 13, 2014

(65) Prior Publication Data
US 2016/0081093 A1    Mar. 17, 2016

(51) Int. Cl.
*H04W 72/04*    (2009.01)
*H04W 72/08*    (2009.01)
*H04J 11/00*    (2006.01)

(52) U.S. Cl.
CPC ....... *H04W 72/0466* (2013.01); *H04J 11/005* (2013.01); *H04W 72/042* (2013.01); *H04W 72/082* (2013.01); *H04J 2211/005* (2013.01)

(58) Field of Classification Search
CPC ............. H04J 11/005; H04J 2211/005; H04W 72/042; H04W 72/0466; H04W 72/082
(Continued)

(56) References Cited

U.S. PATENT DOCUMENTS

2010/0190447 A1   7/2010  Agrawal et al.
2010/0255852 A1* 10/2010  Chen ................... H04W 72/082
                                                                    455/450

(Continued)

OTHER PUBLICATIONS

3GPP TS 36.213 V10.3.0 (3rd Generation Partnership Project; Technical Specification Group Radio Access Network; Evolved Universal Terrestrial Radio Access (E-UTRA); Physical layer procedures (Release 10) (Year: 2011).*

(Continued)

*Primary Examiner* — Melvin C Marcelo
*Assistant Examiner* — Natali Pascual Peguero
(74) *Attorney, Agent, or Firm* — Squire Patton Boggs (US) LLP (57) ABSTRACT

A method and apparatus for a transmission mode with user equipment (UE) independent physical downlink shared channel (PDSCH) scrambling for inter-cell and intra-cell PDSCH-to-PDSCH interference cancellation. A method may include configuring (610) a first identifier (e.g. first RNTI) for a first UE. The method may also include performing at least one of indicating (620) (e.g. semi-statically) a second identifier (e.g. PDSCH RNTI own) for the first UE, or indicating (630) (e.g. semi-statically) a third identifier (e.g. PDSCH RNTIJnt) for the first UE. The first identifier (e.g. first RNTI) is for at least one of operation of physical downlink control channel (PDCCH) of the first UE, or operation of PDSCH of the first UE if the second identifier (e.g. PDSCH RNTI own) is not indicated to the first UE; the second identifier (e.g. PDSCH RNTI own) is for at least one of scrambling or descrambling PDSCH of the first UE; and (Continued)

the third identifier (e.g. PDSCH RNTIJnt) is for at least one of scrambling or descrambling a PDSCH of a second (e.g. interfering) UE. The transmission of the second UE may cause interference on the reception of a PDSCH at the first UE.

20 Claims, 6 Drawing Sheets

(58) Field of Classification Search
USPC .................................. 370/252, 329
See application file for complete search history.

(56) References Cited

U.S. PATENT DOCUMENTS

| | | |
|---|---|---|
| 2010/0309861 A1 | 12/2010 | Gorokhov et al. |
| 2011/0077038 A1 | 3/2011 | Montojo et al. |
| 2011/0222501 A1 | 9/2011 | Kim et al. |
| 2012/0082022 A1 | 4/2012 | Damnjanovic et al. |
| 2013/0003569 A1* | 1/2013 | Lindoff ................ H04L 1/0045 370/252 |
| 2014/0177449 A1* | 6/2014 | Novak .................... H04W 4/70 370/241 |

OTHER PUBLICATIONS

International Search Report and Written Opinion received for corresponding Patent Cooperation Treaty Application No. PCT/US2013/039873, dated Apr. 14, 2014, 17 pages.
European Office Action issued in corresponding European Patent Application No. 13 724 979.3-1214 dated Dec. 18, 2019.
European Office Action issued in corresponding European Patent Application No. 13 724 979.3-1212 dated Sep. 8, 2020.
European Office Action issued in corresponding European Patent Application No. 13 724 979.3-1212 dated Nov. 30, 2021.

* cited by examiner

TRANSMISSION MODE WITH USER EQUIPMENT INDEPENDENT PHYSICAL DOWNLINK SHARED CHANNEL SCRAMBLING FOR INTER-CELL AND INTRA-CELL PDSCH-TO-PDSCH INTERFERENCE CANCELLATION

RELATED APPLICATION

This application was originally filed as Patent Cooperation Treaty Application No. PCT/US2013/039873 filed May 7, 2013.

BACKGROUND

Field

Certain embodiments relate to physical downlink shared channel (PDSCH) scrambling in communication networks. More specifically, certain embodiments relate to a method and apparatus for a transmission mode with user equipment (UE) independent PDSCH scrambling for inter-cell and intra-cell PDSCH-to-PDSCH interference cancellation.

Description of the Related Art

Network-assisted user equipment (UE) receiver operation for inter-cell and inter-user interference cancellation using IC-based, for example, a minimum mean squared error with successive interference cancellation (MMSE-SIC) type of receiver has been studied in the research community including EU research projects, showing rather remarkable gains in terms of inter-cell/inter-user interferer mitigation.

3GPP may investigate such operation as part of the approved study item on network-assisted UE receivers in RP-130404 (approved on Mar. 1, 2013) and the studies in 3GPP may start in April 2013 in the respective RAN1 & RAN4 working group meetings.

SUMMARY

According to a first embodiment, a method may include configuring a first identifier for a first user equipment. The method may also include performing at least one of indicating a second identifier for the first user equipment, or indicating a third identifier for the first user equipment. The first identifier is for at least one of operation of physical downlink control channel (PDCCH) of the first user equipment, or operation of physical downlink shared channel (PDSCH) of the first user equipment if the second identifier is not indicated to the first user equipment. The second identifier is for at least one of scrambling or descrambling a physical downlink shared channel (PDSCH) of the first user equipment. The third identifier is for at least one of scrambling or descrambling a physical downlink shared channel (PDSCH) of a second user equipment. The transmission to the second user equipment is expected to cause interference to the reception of a physical downlink shared channel (PDSCH) of the first user equipment.

According to a second embodiment, an apparatus may include at least one processor and at least one memory including computer program code. Further, the at least one memory and the computer program code are configured to, with the at least one processor, cause the apparatus at least to configure a first identifier for a first user equipment. Also, the at least one memory and the computer program code are configured to, with the at least one processor, cause the apparatus at least to perform at least one of indicating a second identifier for the first user equipment, or indicating a third identifier for the first user equipment. The first identifier is for at least one of operation of physical downlink control channel (PDCCH) of the first user equipment, or operation of physical downlink shared channel (PDSCH) of the first user equipment if the second identifier is not indicated to the first user equipment. The second identifier is for at least one of scrambling or descrambling a physical downlink shared channel (PDSCH) of the first user equipment. The third identifier is for at least one of scrambling or descrambling a physical downlink shared channel (PDSCH) of a second user equipment. The transmission to the second user equipment is expected to cause interference to the reception of a physical downlink shared channel (PDSCH) of the first user equipment.

According to a third embodiment, an apparatus may include configuring means for configuring a first identifier for a first user equipment. The apparatus may also include performing means for performing at least one of indicating a second identifier for the first user equipment, or indicating a third identifier for the first user equipment. The first identifier is for at least one of operation of physical downlink control channel (PDCCH) of the first user equipment, or operation of physical downlink shared channel (PDSCH) of the first user equipment if the second identifier is not indicated to the first user equipment. The second identifier is for at least one of scrambling or descrambling a physical downlink shared channel (PDSCH) of the first user equipment. The third identifier is for at least one of scrambling or descrambling a physical downlink shared channel (PDSCH) of a second user equipment. The transmission to the second user equipment is expected to cause interference to the reception of a physical downlink shared channel (PDSCH) of the first user equipment.

According to a fourth embodiment, a non-transitory computer readable medium may be encoded with instruction that, when executed in hardware, perform a process. The process may include the method according to the first embodiment discussed above.

According to a fifth embodiment, a method may include receiving, at a first user equipment, a first identifier. The method may also include receiving, at the first user equipment, at least one of a second identifier, or a third identifier. The first identifier is for at least one of operation of physical downlink control channel (PDCCH) of the first user equipment, or operation of physical downlink shared channel (PDSCH) of the first user equipment if the second identifier is not indicated to the first user equipment. The second identifier is for at least one of scrambling or descrambling a physical downlink shared channel (PDSCH) of the first user equipment. The third identifier is for at least one of scrambling or descrambling a physical downlink shared channel (PDSCH) of a second user equipment. The transmission to the second user equipment is expected to cause interference to the reception of a physical downlink shared channel (PDSCH) of the first user equipment.

According to a sixth embodiment, an apparatus may include at least one processor and at least one memory including computer program code. Further, the at least one memory and the computer program code are configured to, with the at least one processor, cause the apparatus at least to receive, at a first user equipment, a first identifier. Further, the at least one memory and the computer program code are configured to, with the at least one processor, cause the apparatus at least to receive, at the first user equipment, at least one of a second identifier, or a third identifier. The first identifier is for at least one of operation of physical downlink control channel (PDCCH) of the first user equipment, or operation of physical downlink shared channel (PDSCH) of the first user equipment if the second identifier is not indicated to the first user equipment. The second identifier is for at least one of scrambling or descrambling a physical downlink shared channel (PDSCH) of the first user equipment. The third identifier is for at least one of scrambling or descrambling a physical downlink shared channel (PDSCH) of a second user equipment. The transmission to the second user equipment is expected to cause interference to the reception of a physical downlink shared channel (PDSCH) of the first user equipment.

According to a seventh embodiment, an apparatus may include receiving means for receiving, at a first user equipment, a first identifier. The apparatus may also include receiving means for receiving, at the first user equipment, at least one of a second identifier, or a third identifier. The first identifier is for at least one of operation of physical downlink control channel (PDCCH) of the first user equipment, or operation of physical downlink shared channel (PDSCH) of the first user equipment if the second identifier is not indicated to the first user equipment. The second identifier is for at least one of scrambling or descrambling a physical downlink shared channel (PDSCH) of the first user equipment. The third identifier is for at least one of scrambling or descrambling a physical downlink shared channel (PDSCH) of a second user equipment. The transmission to the second user equipment is expected to cause interference to the reception of a physical downlink shared channel (PDSCH) of the first user equipment.

According to an eighth embodiment, a non-transitory computer readable medium may be encoded with instruction that, when executed in hardware, perform a process. The process may include the method according to the fifth embodiment discussed above.

BRIEF DESCRIPTION OF THE DRAWINGS

For proper understanding of the invention, reference should be made to the accompanying drawings, wherein.

DETAILED DESCRIPTION

Certain embodiments relate to physical downlink shared channel (PDSCH) scrambling in communication networks. More specifically, certain embodiments relate to a method and apparatus for a transmission mode with user equipment (UE) independent PDSCH scrambling for inter-cell and intra-cell PDSCH-to-PDSCH interference cancellation.

In certain embodiments, an operation of a post-decoding interference cancellation receiver, for example, a Minimum Mean Squared Error with Successive Interference Cancellation (MMSE-SIC) receiver, a joint-maximum likelihood detector, or the like, envisioned as a main part of the network-assisted UE reception, is in a way, that the UE may be able to decode also the interfering signals and then remove the interfering signals' interference from the received signal in order to improve the signal reception of its own data. The co-channel PDSCH interference to be canceled in this way can be either intra-cell, that is Multiuser Multiple-Input Multiple-Output (MU-MIMO) interference of a co-scheduled UE including potential intra-cell Coordinated Multipoint (CoMP) MU-MIMO or a more traditional inter-cell interference (from a neighboring cell).

Figure 1:
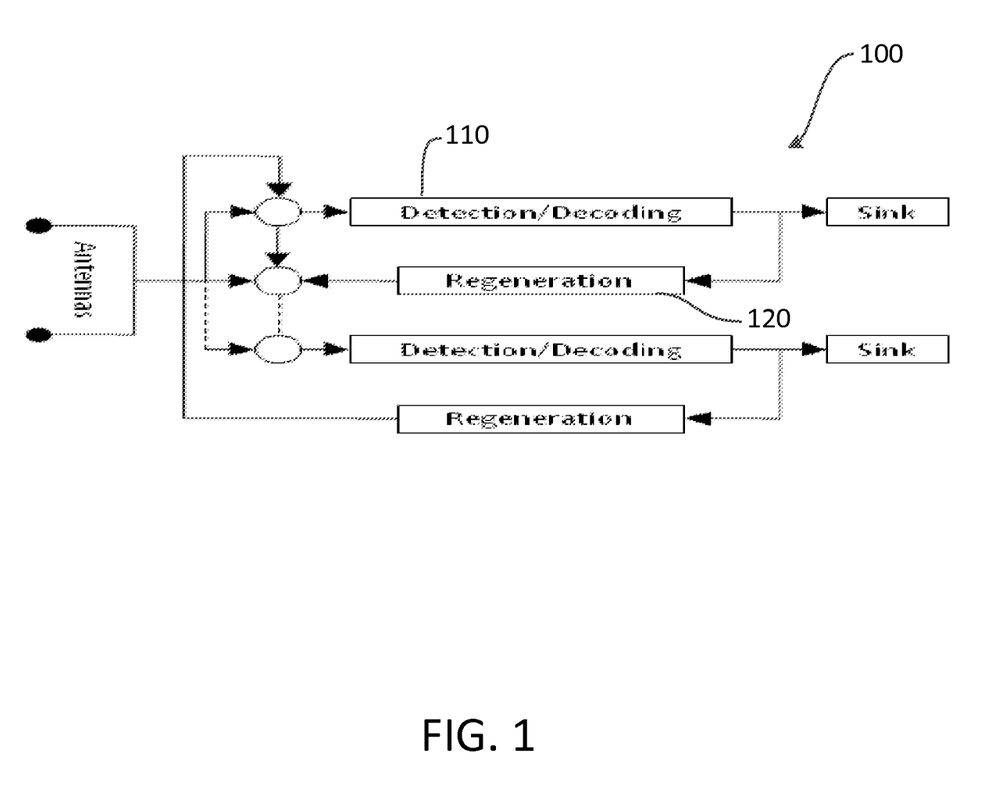
FIG. 1 illustrates block diagram of a serial/parallel interference cancellation process according to certain embodiments.

FIG. 1 illustrates block diagram of a serial/parallel interference cancellation process 100 according to certain embodiments. FIG. 1 shows an example block diagram reflecting the operation of a post-decoding MMSE-SIC receiver. This receiver may be iterative or non-iterative as shown in FIG. 1. Process 100 may include at least one detection/decoding module 110 and at least one regeneration module 120.

Process 100 is particularly applicable if the UE is able to decode the interfering signal as such, that is the detection/decoding module 110 of the interfering signal has been successful, so that the regeneration module 120 process and cancellation can be applied.

In order for a UE to be able to decode some interfering signal, for example, to be able to do the decoding of an interfering physical channel, for example, PDSCH successfully, the following example information, as shown in Table 1, would be needed at the UE about the interfering (PDSCH) signal.

TABLE 1

| | Reason | Approximate size in bits |
|---|---|---|
| Precoder, Power Offset | Only for CRS based transmission modes, may change dynamically | 2 or 4 for rank = 1, 3 or 6 bits in general, 1 bit for MU-MIMO power offset (TM5) |
| DM-RS scrambling seed incl. MU-MIMO support | Scrambling seed usually eNB/TP specific - no need to have dynamically signaled | 2 bits for AP & n_SCID/ Scrambling [0 . . . 503] = 9 bit |
| Interference rank | Could be either fixed to be rank 1 - or then dynamical signaling if enabling higher rank SIC operation | Implicitly known if limited to rank 1, or else up to 2/3 bits for DM-RS based TM. For CRS based TM included in the precoder signaling |

TABLE 1-continued

| | Reason | Approximate size in bits |
|---|---|---|
| PRBs allocated | May change dynamically | max. 25 bits for 20 MHz |
| PDSCH starting symbol | May change dynamically | 2 |
| Rate matching of interfering PDSCH (incl. CSI-RS config for interfering PDSCH, CRS positions, etc.) | eNB specific through RRC signaling - no need to have dynamically signaled | Varying size depending on configuration of interfering eNB. |
| TM | Usually semi-static | Max 4 bits |
| MCS | May change dynamic | 5 bits (for rank = 1) 10 bits (for rank > 1) |
| PDSCH scrambling: RNTI, Cell-ID | UE specific - interferer may change dynamically, even if interfering eNB/cell is the same | 16 bits for RNTI, 9 bits cell ID |
| Redundancy Version | Changes dynamically | 2 |
| Subframe Offset PSS/SSS | eNB specific - no need to have dynamically signaled | 4 |

In Table 1, some preliminary evaluation data are shown, about how many bits the information signaling about the interference as such may include. It should be noted that some of this information may change from time to time or this information may be assumed to be valid for longer time. For example, the bit sizes of the following may change: Precoder, Power Offset; Demodulation Reference Signal (DM-RS) scrambling seed, including Multiuser Multiple-Input Multiple-Output (MU-MIMO); Interference Rank; PDSCH starting symbol; Physical Resource Blocks (PRBs) allocated; MCS index; Redundancy Version; and PDSCH scrambling; Radio Network Temporary Identifier (RNTI), Cell-ID.

Some of the issues of the above example in Table 1 may be fixed semi-statically.

Careful selection may be needed for the variables that are semi-statically configured, that is, the variables that will remain fixed for a certain amount of time or until a new configuration is received, and those values that are signaled dynamically about the interference in the Downlink Control Information (DCI) as part of the PDSCH assignment, in order to have a good tradeoff between performance and extra control-channel overhead when enabling a network-assisted post-decoding MMSE-SIC. For example, a second or third identifier, such as PDSCH_RNTI_Own and/or PDSCH_RNTI_INT (discussed below), may be fixed for a certain amount of time or until a new configuration is received, as described above.

According to 3GPP TS 36.211 in Section 6.3.1, herein incorporated by reference, the PDSCH codewords may be scrambled UE-specifically (due to RNTI (Radio Network Temporary Identifier)) using the scrambling initialization according to equation (1):

$$c_{init} = \begin{cases} n_{RNTI} \cdot 2^{14} + q \cdot 2^{13} + \lfloor n_s/2 \rfloor \cdot 2^9 + N_{ID}^{cell} & \text{for PDSCH} \\ \lfloor n_s/2 \rfloor \cdot 2^9 + N_{ID}^{MBSFN} & \text{for PMCH} \end{cases} \quad (1)$$

where $c_{init}$ is an initialization value which may depend on a transport channel type, $n_{RNTI}$ is a radio network temporary identifier which corresponds to the RNTI associated with the PDSCH transmission, $n_s$ is a slot number within a radio frame, $N_{ID}^{cell}$ is a physical layer cell identity, $N_{ID}^{MBSFN}$ is a Multicast-Broadcast Single Frequency Network (MBSFN) area identity in relation to the physical multicast channel (PMCH), and q is a codeword.

Thus, in order to be able to decode an interfering PDSCH, the knowledge of $n_{RNTI}$ value as well as the $N_{ID}^{cell}$ and the number of the slot $n_s$ is needed. The slot count ($n_s$) and the $N_{ID}^{cell}$ are preferably stable, as the strongest interfering cell may not be changing very fast for a low mobility UE, and the slot number of an interfering cell may be just a fixed offset compared to that of the serving cell of the UE, that is, the interfering eNB is not changing fast in time and therefore may be configured semi-statically. In addition with the $N_{ID}^{cell}$ being known, the UE may decode the neighbor cell PBCH (Physical Broadcast Channel) and extract the SFN (System Frame Number).

In certain embodiments a new RNTI for PDSCH scrambling in addition to the existing RNTIs may be used for supporting the network-assisted UE receiver operation.

In equation (1), instead of a UE specific RNTI value ($n_{RNTI}$), another RNTI value, denoted here as "PDSCH_RNTI" which is not UE specific as such (but several UEs may have the same PDSCH_RNTI for their own PDSCH) could be used for scrambling the (interfering) PDSCH (intra-cell/MU-MIMO, or inter-cell/neighbor cell) in order to make it decodable for other UEs and it is therefore additionally configured for a UE. In this respect, certain embodiments distinguish from a single UE point of view between two PDSCH RNTIs, one that is used for the UEs' own PDSCH scrambling which may be denoted here as "PDSCH_RNTI_own" as well as the RNTI used for UEs which PDSCH is interfering, as "PDSCH_RNTI_int".

Figure 2A:
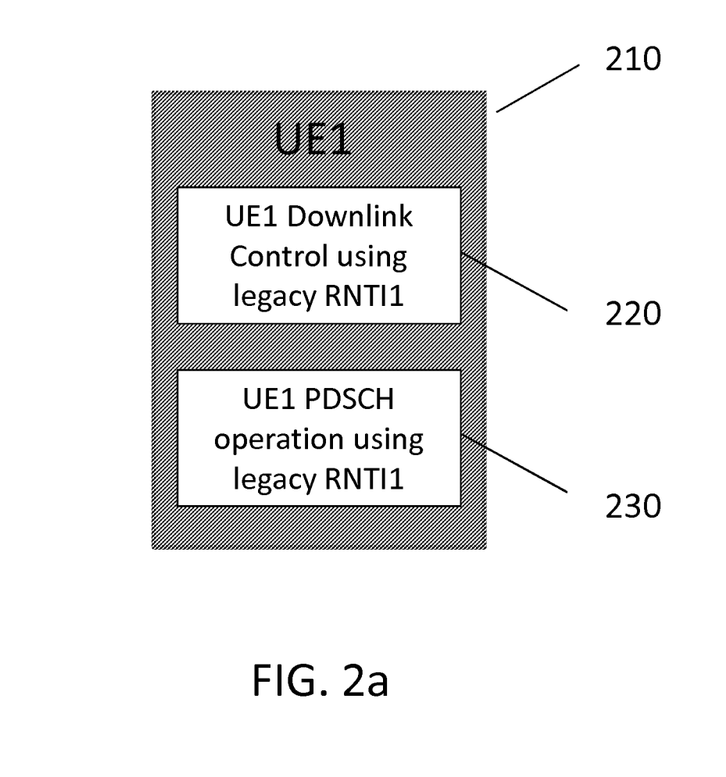
FIGS. 2a and 2b illustrate the difference in operation of a legacy UE and a UE according to certain embodiments with respect to data channel scrambling.
Figure 2B:
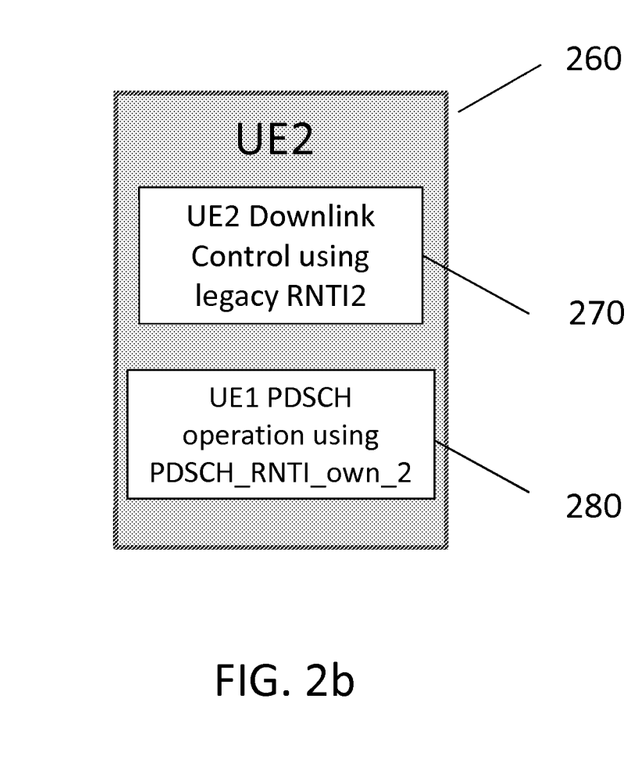

In FIGS. 2a and 2b, some embodiments show the difference in terms of operation of legacy UEs 210 in FIG. 2a compared to the operation of the intended PDSCH scrambling for the novel operation mode in FIG. 2b and UE 260, respectively. For the legacy UE 210, the legacy RNTI value is used when operating DL control information on PDCCH (physical downlink control channel) and (E)PDCCH (enhanced PDCCH) in block 220 and for scrambling purposes of the PDSCH of UE 210.

In certain embodiments, the control information on PDCCH and/or EPDCCH for a UE may still be handled with the UE-specific legacy RNTI value, as the RNTI value may be used to identify the correct recipient of the control messages, that is, DCIs as shown for UE 260 in block 270. In addition, if the PDSCH_RNTI value would be used on PDCCH/EPDCCH, then the UE may not "know" if the correctly decoded DCI message is actually intended for it or another UE using the same PDSCH_RNTI.

Therefore, the legacy operation of PDCCH/EPDCCH may not be affected—for PDCCH/EPDCCH the "legacy RNTI" value may be used for UEs 260 according to these embodiments as have been used for legacy UEs 210. In contrast, for UEs 260 according to the embodiments for PDSCH scrambling, the additionally configured PDSCH-RNTI (PDSCH_RNTI_own) value may be applied in block 280, instead of the legacy PDSCH scrambling of block 230 using the legacy RNTI. Given the above discussion of the legacy operation, the issue of downlink control may be operated in the legacy operation mode, while other embodiments may fully concentrate only on the PDSCH scrambling.

Considering this operation, several different ways of which "PDSCH-RNTI" (PDSCH_RNTI_own and/or PDSCH_RNTI_int) may be configured for the UEs can be considered (but this could be of course up to the network to decide its preferred mode of operation) as follows.

In some embodiments, the PDSCH_RNTI_own can be configured as cell-specific, that is, the PDSCHs of UEs which are potential cancellation targets from a cell will use the same RNTI (PDSCH_RNTI_own) for the PDSCH scrambling. This technique will still enable neighbor cell scrambling—but for MU-MIMO, this same RNTI value for the MU-MIMO paired UE would be applicable (no inter-user MU-MIMO PDSCH scrambling). For example, when considering two neighboring cells, a PDSCH_RNTI_own1 for PDSCH scrambling could be used for cell-1 UEs and PDSCH_RNTI_own2 for PDSCH scrambling for cell-2 UEs.

In other embodiments, the PDSCH_RNTI_own may be a UE-group-specific RNTI value. For example, in the case of intra-cell Coordinated Multipoint (CoMP) operation the user grouping may be done in such a manner that the same RNTI (PDSCH_RNTI_own) value may be configured to be used for PDSCH scrambling of UEs connected to the same transmission point within the cell, therefore enabling different PDSCH scrambling from different CoMP transmission points. Moreover, this UE-grouping could also be applied for operation of MU-MIMO, so that at least some other MU-MIMO UE pairs will have different scrambling applied.

Figure 3:
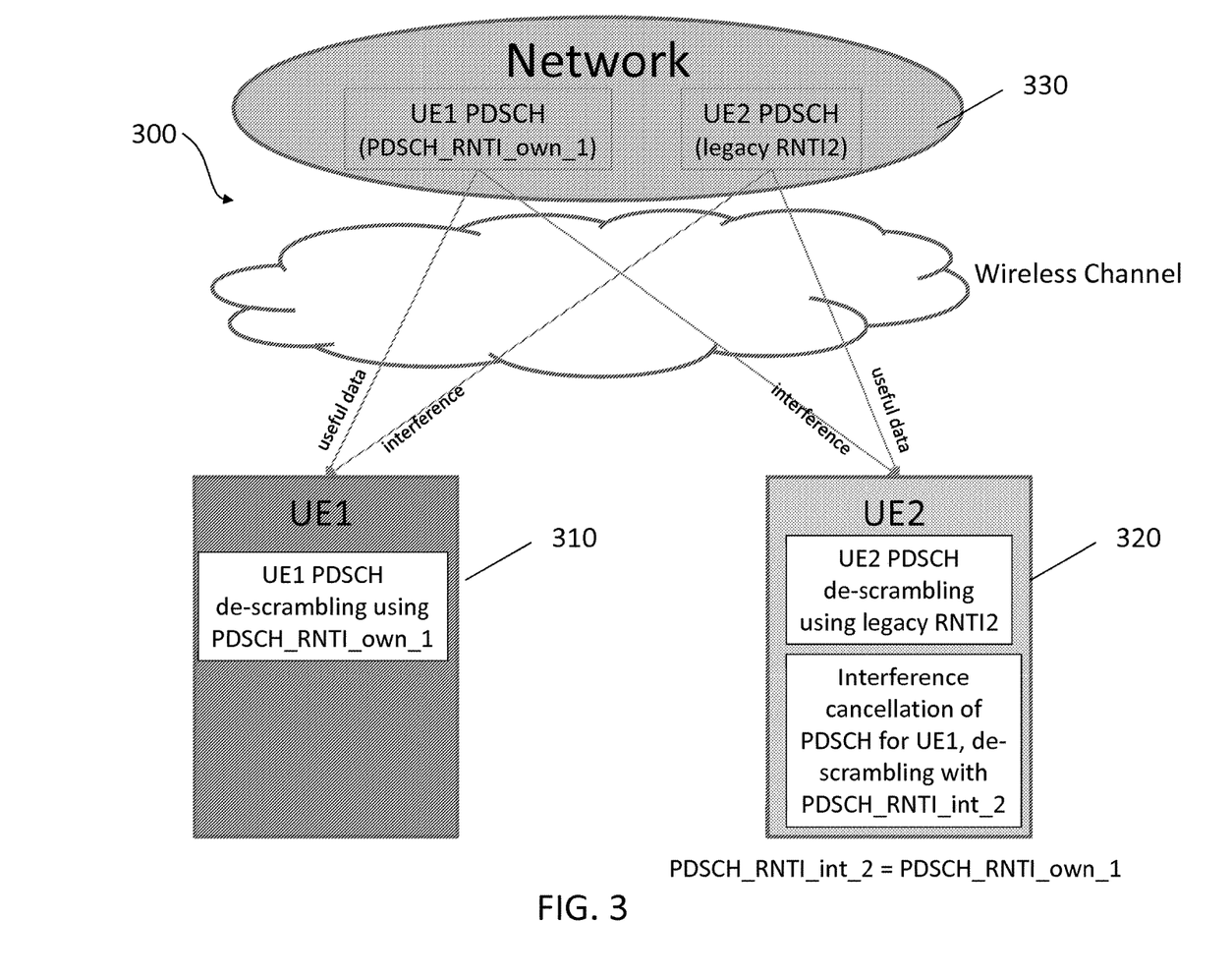
FIG. 3 illustrates an operation of a UE pair according to certain embodiments.

FIG. 3 illustrates an operation 300 of a UE pair according to certain embodiments. FIG. 3 shows a UE pair (UE 310 and UE 320), where UE 320 attempts to cancel the PDSCH transmitted for UE 310 using the PDSCH_RNTI_own1 of PDSCH transmission for UE1's PDSCH from a network 330. In this operation, the PDSCH transmitted for UE 310 is a cancellation target for UE 320, and therefore the PDSCH_RNTI_own1 will be configured for UE 310 PDSCH scrambling to make it also decodable for UE 320. In this example operation, UE 310 is not trying to cancel the PDSCH interference from the PDSCH of UE 320 and therefore does not need to be aware of the scrambling applied for PDSCH of UE 320. Therefore, the PDSCH of UE 320 can still use its legacy RNTI (legacy RNTI2) and there is no need to use any PDSCH_RNTI for the scrambling of the PDSCH of UE 320.

On the other hand, in addition to knowing its own PDSCH scrambling, UE 320 trying to cancel the PDSCH for UE 310 needs to be informed by the network about the applied RNTI used for the scrambling of PDSCH for UE 310 to be able to cancel it, that is, it will be configured with PDSCH_RNTI_int2. Moreover, the network will need to take care that the PDSCH_RNTI_own1 for UE 310 equals to PDSCH_RNTI_int_2 for UE 320. In summary, in this example operation 300, where UE 320 is trying to cancel UE 310 PDSCH while UE 310 is not trying to cancel UE 320, UE 310 in addition to legacy operation needs to be configured only with PDSCH_RNTI_own1 for its own (UE1) PDSCH descrambling and UE 320 needs to be configured only with PDSCH_RNTI_int2 to be used for the descrambling of the interfering PDSCH in the interference cancellation procedure. In this case, PDSCH_RNTI_int2 and PDSCH_RNTI_own1 need to be configured by the network with the same value.

The operation 300 may be also extended to cases where UEs in different cells or in MU-MIMO transmissions would attempt to cancel interference from transmissions intended to each other.

Figure 4:
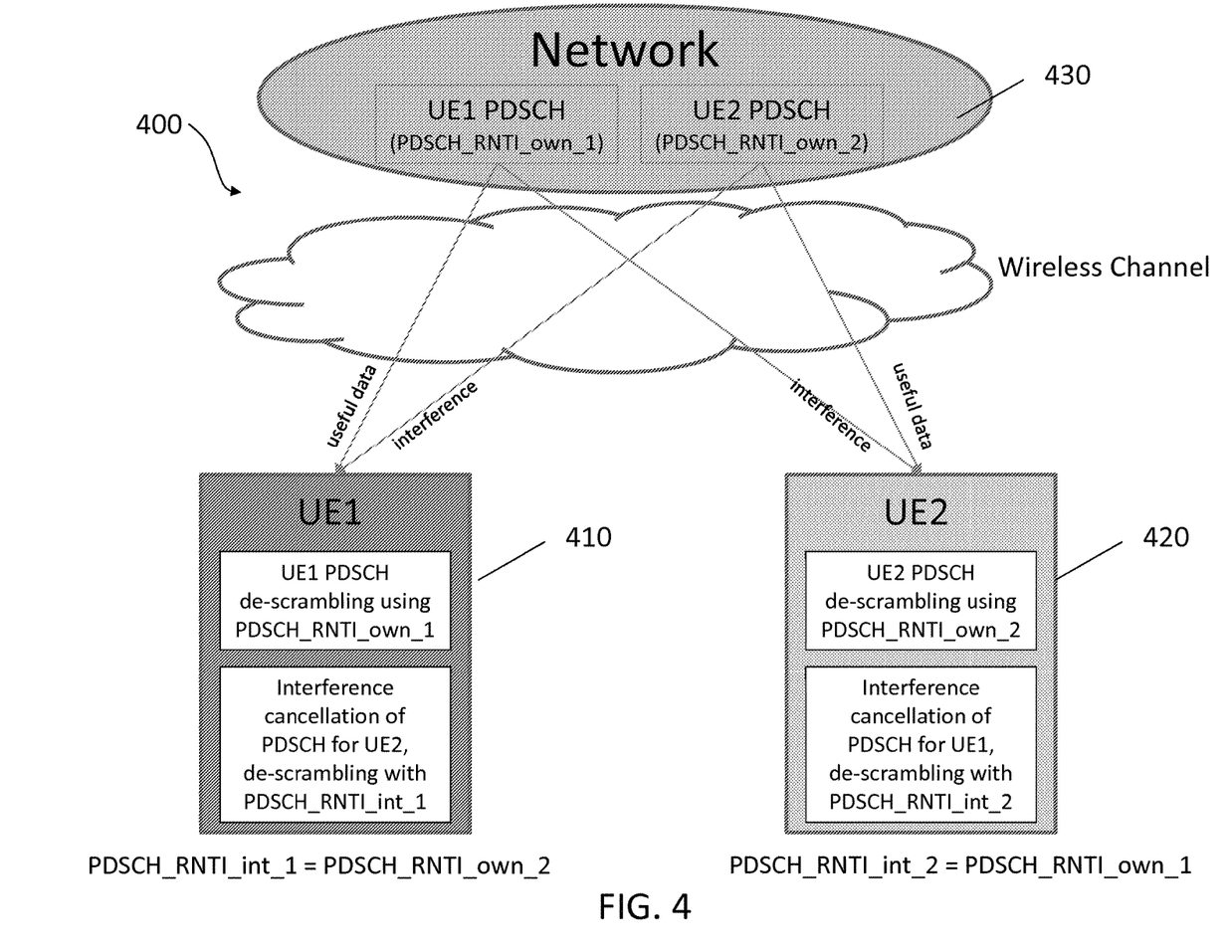
FIG. 4 illustrates an operation of a UE pair according to further embodiments.

FIG. 4 illustrates an operation 400 of a UE pair according to certain embodiments. FIG. 4 shows a UE pair (UE 410 and UE 420) which attempts to cancel each other's PDSCH using the PDSCH_RNTI of PDSCH transmission from a network 430. In operation 400 at least one PDSCH_RNTI_own value may be used for PDSCH scrambling by the network 430 of all the UEs' (410, 420) PDSCH, such that some UE in the network (for example, 410 or 420) might be requested to try to decode to cancel the interference. This means that also a UE 410, named here UE1, may try to cancel some PDSCH intended for another UE, for example, UE 420 (UE2). Therefore, the network 430 may need to use some PDSCH_RNTI_own for PDSCH scrambling not just for UE 420 (UE2) but as well for UE 410 (UE1), if some other UE, for example, UE 420 (UE2) might like to cancel the interference of PDSCH for UE 410 (UE1). For example, in FIG. 4, UE 410 (UE1) and UE 420 (UE2) attempt to cancel the other UE's PDSCH, so for UE 410 the network configures PDSCH_RNTI_int1 to be used by UE 410 for the descrambling of the interfering PDSCH as well as PDSCH_RNTI_int2 for UE 420 (UE2) for the same purpose. In order to make the cross-cancellation possible, the network 400 will need to guarantee for the cross-UE cancellation in this case, that the value configured for PDSCH_RNTI_int1 equals the value of PDSCH_RNTI_own2 and the value configured for PDSCH_RNTI_int2 corresponds to the value of PDSCH_RNTI_own1. The operation 400 of FIG. 4 is therefore just a cross-UE configuration of PDSCH_RNTI_own for a UE (410, 420) of its own PDSCH as well as the configuration of PDSCH_RNTI_int for interfering PDSCH for interference cancellation, and as such just a double configuration extension from operation 300 of FIG. 3.

Looking now to UE configurations, three different types of configurations for a UE may be considered:

UE is an interference cancellation (IC) target—but not requested to do interference cancellation (as UE 310 of FIG. 3): Only the PDSCH_RNTI_own for the scrambling of the own PDSCH needs to be additionally configured. This also applies to UEs which might not have interference cancellation capabilities.

UE is not an IC target—but requested by the network to try interference cancellation (as UE 320 of FIG. 3): Only the PDSCH_RNTI_int of the interfering PDSCH needs to be configured additionally for those UEs. UE needs to be interference cancellation capable.

UE is an IC target and requested by the network to try IC (as UE 410 and UE 420 of FIG. 4): The PDSCH_RNTI_own of the UEs PDSCH as well as the PDSCH_RNTI_int of the interfering PDSCH needs to be additionally configured for those UEs. Of course, these UEs will need to be interference cancellation capable as well.

It should be noted that the PDSCH_RNTI may only be applied for PDSCH scrambling, but may not be used for control channel operation as mentioned in connection to FIGS. 2a and 2b. Further, as mentioned above when considering group and/or cell-specific RNTI, the values of PDSCH_RNTI_own1 for PDSCH of UE 410 (UE1) and PDSCH_RNTI_own2 for PDSCH of UE 420 (UE2) may be selected to be the same by the network 430.

In some embodiments the UE specific RNTI values have been partially introduced in order to provide some scrambling between the PDSCH transmitted to different UEs, that is, in order to make the data not decodable to other UEs. However, for post-decoding MMSE-SIC receiver it may be required to decode the interferer's codeword, which implies that the values of RNTI used to scramble the interfering transmission should be known by the "victim" UE at least. From a decoding performance point of view, a PDSCH performance degradation may be seen by using the same scrambling RNTI value, for example, in case of two overlapping and interfering PDSCHs intended for different users using baseline receivers, but by using the network-assisted SIC receivers this may not become an issue.

In certain embodiments, the current 16-bit RNTI definition has a few unused values. One of these values may be configured for scrambling the interfering PDSCH(s) and as the PDSCH_RNTI_int value of the interfering PDSCH(s) and only needs to be semi-statically configured to the UE performing neighbor cell/other user interference cancellation, instead of requiring 16 additional bits of dynamic signaling carried on PDCCH or Enhanced Physical Downlink Control Channel (EPDCCH) to be able to cancel some interfering PDSCH intended for another user. Actually RNTI values may be selected from any possible set of RNTI values which may be configured as PDSCH_RNTI_own/ PDSCH_RNTI_int value for PDSCH scrambling of the PDSCH intended for another user interfering as well as potentially the PDSCH scrambling of its own data channel (i.e., there is no need to restrict just to the unused RNTI values). The semi-statical configuration of the new PDSCH_RNTI_int to be used in the interference cancellation process of the UE may reduce the amount of PDCCH/ EPDCCH signaling load/overhead without restricting the network operation in terms of scheduling flexibility and without the resulting performance loss on a network level.

In some embodiments, for the PDSCH transmissions (intended for UEs in the neighbor cell or same cell in case of MU-MIMO) the same or a different PDSCH_RNTI_own values may be configured by the network for PDSCH scrambling for different UEs.

In other embodiments, the UE may be configured to use PDSCH_RNTI_own for its own PDSCH transmissions and may use the values of the configured PDSCH_RNTI_own instead of the values of the legacy RNTI for its own PDSCH descrambling, as described earlier with respect to FIGS. 3 and 4. Alternatively, based on the need to have the PDSCH of the UE to be decodable for other UEs, a dynamic 1-bit signaling or 1-bit indication of the used PDSCH RNTI to toggle between legacy and PDSCH_RNTI_own for its own PDSCH scrambling may be used and may be included in the DCI (Downlink Control Information) formats providing the PDSCH assignment. This optional dynamic 1-bit signaling or 1-bit indication would basically toggle the UE behavior between not being an IC target (UE 210, UE 320) and being an IC target (UE 260/UE 310, UE 410 and UE 420).

As mentioned above with regard to Table 1, other semi-static configurations of certain link parameters of the interfering PDSCH may be envisioned (PRB allocation, MCS, precoder, rank, etc.).

Figure 5:
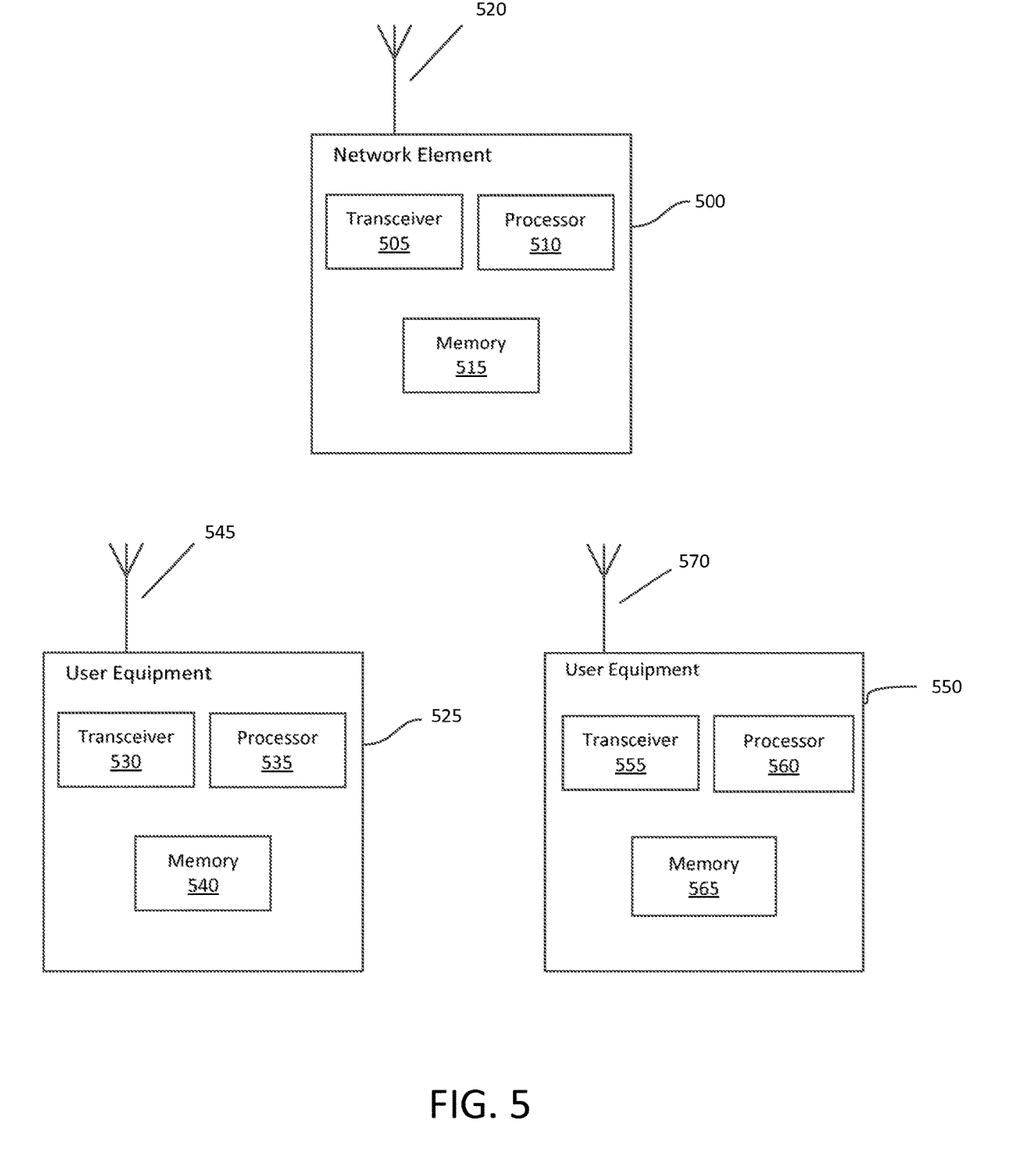
FIG. 5 illustrates a block diagram of a system according to certain embodiments.

FIG. 5 illustrates a block diagram of a system according to certain embodiments. In one embodiment, a system may comprise several devices, such as, for example, network element 500, user equipment 525, and user equipment 550. Network element 500 may correspond to an element in network 330, shown in FIG. 3 and network 430 in FIG. 4. The system may comprise more than the network element or user equipment, as shown in FIG. 5 for the purposes of illustration. Network element 500 may be an eNodeB, MME, or the like. User equipment 525 and user equipment 550 may be any Internet-connected device, such as a tablet computer, mobile phone, smart phone, laptop computer, desktop computer, personal digital assistant (PDA) or the like.

Each of the devices in the system may comprise at least one processor, respectively indicated as 510, 535, and 560. At least one memory may be provided in each device, and indicated as 515, 540, and 565, respectively. The memory may comprise computer program instructions or computer code contained therein. One or more transceiver 505, 530, and 555 may be provided, and each device may also comprise an antenna, respectively illustrated as 520, 545, and 570. Although only one antenna each is shown, many antennas and multiple antenna elements may be provided to each of the devices. Other configurations of these devices, for example, may be provided. For example, network element 500, user equipment 525, and user equipment 550 may be additionally or solely configured for wired communication and in such a case antennas 520, 545, and 570 may illustrate any form of communication hardware, without being limited to merely an antenna.

Transceivers 505, 530, and 555 may each, independently, be a transmitter, a receiver, or both a transmitter and a receiver, or a unit or device that may be configured both for transmission and reception.

Processors 510, 535, and 560 may be embodied by any computational or data processing device, such as a central processing unit (CPU), application specific integrated circuit (ASIC), or comparable device. The processors may be implemented as a single controller, or a plurality of controllers or processors.

Memories 515, 540, and 565 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and may be processed by the processors may be any suitable form of computer program code, for example, a compiled or interpreted computer program written in any suitable programming language.

The memory and the computer program instructions may be configured, with the processor for the particular device, to cause a hardware apparatus such as network element 500, user equipment 525, and user equipment 550, to perform any of the processes described above (see, for example, FIG. 3 and FIG. 4). Therefore, in certain embodiments, a non-transitory computer-readable medium may be encoded with computer instructions that, when executed in hardware, may perform a process, such as one of the processes described herein. Alternatively, certain embodiments of the invention may be performed entirely in hardware.

Figure 6:
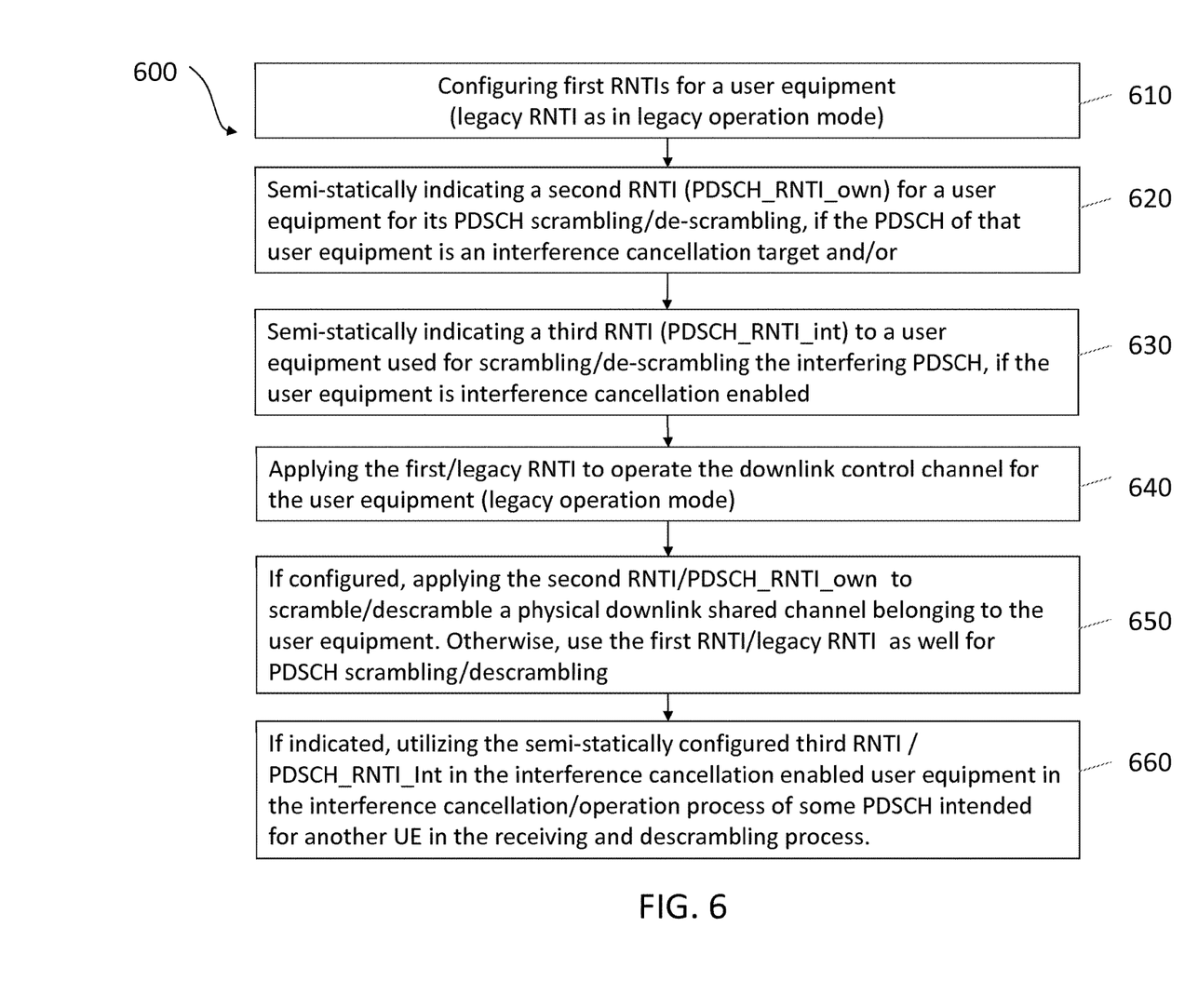
FIG. 6 illustrates a flow diagram of a method according to certain embodiments.

FIG. 6 illustrates a flow diagram of a method 600 according to certain embodiments. FIG. 6 shows that an example embodiment for the interaction between the network and the user equipment, and the intended receiver behavior of the user equipment. At step 610, the method may include configuring first RNTIs for a user equipment according to legacy behavior according to LTE Rel. 8-11. At step 620, the method may include semi-statically configuring a second RNTI (PDSCH_RNTI_own) for a first user equipment in case the PDSCH for that UE might be an interference cancellation target (i.e., another UE is trying to cancel that PDSCH transmission).

At step 630 the method may include indicating the PDSCH_RNTI_int to the user equipment, if the user equipment is interference cancellation capable and enabled for descrambling an interfering physical downlink shared channel as being part of a semi-static network assisted interference cancellation operation. At step 640, the method includes applying the first (legacy RNTI) in the coding process at the network side and the decoding process at the user equipment of the downlink control channel (including PDCCH or EPDCCH) for that UE as in legacy operation mode.

At step 650, the method may also include applying the PDSCH_RNTI to scramble/descramble a physical downlink shared channel belonging to the user equipment, if the user equipment has been configured in step 630 with a PDSCH_RNTI_own. Otherwise, the method will apply the legacy RNTIs configured in step 610 for physical downlink shared channel scrambling and descrambling. At step 660, the method may still further include utilizing the semi-statically indicated PDSCH_RNTI_int (if indicated in step 630) in the interference cancellation process of some interfering physical downlink shared channel in the interference cancellation capable user equipment during the descrambling process of the interfering physical downlink shared channel.

Additionally, a dynamic 1-bit signaling or 1-bit indication may be included in the DCI (Downlink Control Information) formats providing the PDSCH assignment to indicate to the UE to try to perform interference cancellation. This optional dynamic 1-bit signaling or 1-bit indication would basically toggle the UE behavior between performing IC using PDSCH_RNTI_int (UE 320, UE 410 and UE 420) and not performing IC of another UEs PDSCH (UE 210, UE 260 and UE 310).

In certain embodiments, the network may semi-statically configure a PDSCH_RNTI_own to be used for PDSCH scrambling by means of RRC signaling for UEs whose PDSCH may be a target for interference cancellation operation of at least one other UE, in addition to the legacy configurations.

In other embodiments, the application of the PDSCH_RNTI_own for PDSCH scrambling of the PDSCH—having two options: PDSCH_RNTI_own may always be used for PDSCH scrambling for this UE(s); or dynamic toggling between legacy RNTI/scrambling, for example, when there is no need for another UE to decode the PDSCH intended for this UE's channels, and PDSCH_RNTI_own, for example, when there is a need for another UE to try to cancel, as part of the dynamic DCI signaling may be used.

In certain embodiments, the network may semi-statically (RRC) configure the PDSCH_RNTI_int for the interference cancellation capable and enabled UE to be used for the descrambling of the interfering PDSCH as part of the semi-static "network assistance" when trying to decode other users' PDSCH signal in order to cancel the interference from its own PDSCH signal.

Certain embodiments utilize the semi-statically configured PDSCH_RNTI_int of the interfering PDSCH in the interference cancellation enabled UE in the descrambling process when trying to decode some other users' PDSCH in order to cancel the interference from the other user's own received signal.

Thus, in certain embodiments, the dynamic (PDCCH/EPDCCH) signaling needs/overhead in order to support network assisted other user MMSE-SIC interference suppressing is dramatically decreased.

In certain embodiments, the method may include coordinating the values configured for PDSCH_RNTI_own and PDSCH_RNTI_int for different UEs so that the cancellation of one UEs PDSCH becomes possible for another UE and potentially vice versa.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. An apparatus, comprising:
   at least one processor; and
   at least one memory including computer program code,
   wherein the at least one memory and the computer program code are configured to, with the at least one processor, cause the apparatus at least to
   apply a first identifier in a coding process of a physical downlink control channel of a first user equipment;
   configure and transmit the first identifier to the first user equipment;
   configure and indicate a second identifier to the first user equipment; and
   indicate a third identifier to the first user equipment,
   wherein the first identifier is for identifying a recipient of the physical downlink control channel, and for a decoding process at the first user equipment of the physical downlink control channel;
   the second identifier is for at least one of scrambling a physical downlink shared channel of the first user equipment at the network element, descrambling the physical downlink shared channel of the first user equipment at the first user equipment, or descrambling the physical downlink shared channel of the first user equipment at a second user equipment;
   the first identifier is different from the second identifier;
   the third identifier is for at least one of scrambling a physical downlink shared channel of the second user equipment at the network element, descrambling the physical downlink shared channel of the second user equipment at the second user equipment, or descrambling the physical downlink shared channel of the second user equipment at the first user equipment,
   wherein transmission of the physical downlink shared channel of the second user equipment to the second user equipment is expected to cause interference to the reception of the physical downlink shared channel of the first user equipment at the first user equipment.

2. The apparatus of claim 1, wherein at least one of the second identifier or the third identifier are semi-statically configured for the first user equipment.

3. The apparatus of claim 2, wherein a value of the at least one of the semi-statically configured second identifier or the semi-statically configured third identifier is fixed for a certain amount of time or until a new value is configured.

4. The apparatus according to claim 1, wherein the memory and the computer program code are further configured, with the at least one processor, to cause the apparatus to
perform a physical downlink shared channel assignment for the first user equipment, wherein the physical downlink shared channel assignment comprises a one bit indication to instruct the first user equipment to use the second identifier for descrambling the physical downlink shared channel of the first user equipment.

5. The apparatus according to claim 1, wherein the third identifier is for descrambling of the physical downlink shared channel of the second user equipment to cancel interference from the physical shared channel of the second user equipment.

6. The apparatus according to claim 1, wherein the memory and the computer program code are further configured, with the at least one processor, to cause the apparatus to
perform a physical downlink shared channel assignment for the first user equipment, wherein the physical downlink shared channel assignment includes additional information of the physical downlink shared channel transmitted of the second user equipment, in which case the first user equipment uses the third identifier for descrambling the physical downlink shared channel of the second user equipment.

7. The apparatus according to claim 1, wherein the memory and the computer program code are further configured, with the at least one processor, to cause the apparatus to
perform a physical downlink shared channel assignment for the first user equipment, wherein the physical downlink shared channel assignment comprises a one bit indication to instruct the first user equipment to cancel interference including decoding the physical downlink shared channel of the second user equipment using the third identifier for descrambling.

8. The apparatus according to claim 1, wherein the at least one of the first, second, or third identifiers is a radio network temporary identifier.

9. The apparatus according to claim 8, wherein a value of the at least one of the first, second, or third identifiers is selected from a set of radio network temporary identifier values.

10. An apparatus, comprising:
at least one processor; and
at least one memory including computer program code, wherein the at least one memory and the computer program code are configured to, with the at least one processor, cause the apparatus at least to
receive, from a network element, a first identifier;
apply the first identifier in a decoding process at the apparatus of a physical downlink control channel;
receive, from the network element, a second identifier and a third identifier,
wherein the second identifier is for at least one of scrambling a physical downlink shared channel of the apparatus at the network element, or descrambling the physical downlink shared channel of the apparatus at a second user equipment; the third identifier is for at least one of scrambling a physical downlink shared channel of the second user equipment at the network element, or descrambling the physical downlink shared channel of the second user equipment at the second user equipment;
descramble, based on the second identifier, the physical downlink shared channel of the apparatus;
descramble, based on the third identifier, the physical downlink shared channel of the second user equipment;
wherein the first identifier is different from the second identifier; and
perform cancellation of interference caused to the reception of the physical downlink shared channel of the apparatus from transmission of the physical downlink shared channel of the second user equipment to the second user equipment.

11. The apparatus of claim 10, wherein at least one of the second identifier or the third identifier are semi-statically received in the apparatus.

12. The apparatus of claim 11, wherein a value of the at least one of the semi-statically received second identifier or the semi-statically received third identifier is fixed for a certain amount of time or until a new value is received.

13. The apparatus according to claim 10, wherein the memory and the computer program code are further configured, with the at least one processor, to cause the apparatus to
receive a physical downlink shared channel assignment, wherein the physical downlink shared channel assignment comprises a one bit indication to instruct the apparatus to use the second identifier for descrambling the physical downlink shared channel of the apparatus.

14. The apparatus according to claim 10, wherein the memory and the computer program code are further configured, with the at least one processor, to cause the apparatus to
use the third identifier for descrambling the physical downlink shared channel of the second user equipment when trying to cancel interference from the physical shared channel of the second user equipment.

15. The apparatus according to claim 10, wherein the memory and the computer program code are further configured, with the at least one processor, to cause the apparatus to
receive a physical downlink shared channel assignment, wherein the physical downlink shared channel assignment includes additional information of the physical downlink shared channel transmitted of the second user equipment, in which case the apparatus uses the third identifier for descrambling a physical downlink shared channel of the second user equipment.

16. The apparatus according to claim 10, wherein the memory and the computer program code are further configured, with the at least one processor, to cause the apparatus to
receive a physical downlink shared channel assignment, wherein the physical downlink shared channel assignment comprises a one bit indication to instruct the apparatus to cancel interference including decoding the physical downlink shared channel of the second user equipment using the third identifier for descrambling.

17. The apparatus according to claim 10, wherein the at least one of the first, second, or third identifiers is a radio network temporary identifier.

18. The apparatus according to claim 17, wherein a value of the at least one of the first, second, or third identifiers is selected from a set of radio network temporary identifier values.

19. A method, comprising:
receiving, at a first user equipment, a first identifier from a network element;
applying the first identifier in a decoding process at the first user equipment of a physical downlink control channel;
receiving, from the network element, a second identifier and a third identifier,
wherein the second identifier is for at least one of scrambling a physical downlink shared channel of the first user equipment, or descrambling the physical downlink shared channel of the first user equipment at a second user equipment; the third identifier is for at least one of scrambling a physical downlink shared channel of the second user equipment at the network element, or descrambling the physical downlink shared channel of the second user equipment at the second user equipment;
descrambling, based on the second identifier, the physical downlink shared channel of the first user equipment at the first user equipment;
descrambling, based on the third identifier, the physical downlink shared channel of the second user equipment at the first user equipment,
wherein the first identifier is different from the second identifier; and
performing cancellation of interference caused to the reception of the physical downlink shared channel of the first user equipment at the first user equipment from transmission of the physical downlink shared channel of the second user equipment to the second user equipment.

20. The method according to claim 19, further comprising:
receiving, at the first user equipment, a physical downlink shared channel assignment, wherein the physical downlink shared channel assignment comprises a one bit indication to instruct the first user equipment to use the second identifier for descrambling a physical downlink shared channel of the first user equipment.

* * * * *